(12) United States Patent
Stevens

(10) Patent No.: US 7,643,039 B2
(45) Date of Patent: Jan. 5, 2010

(54) METHOD AND APPARATUS FOR CONVERTING A COLOR IMAGE

(75) Inventor: Andrew Stevens, Wangen/Starnberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 657 days.

(21) Appl. No.: 11/071,879

(22) Filed: Mar. 3, 2005

(65) Prior Publication Data

US 2005/0243109 A1 Nov. 3, 2005

Related U.S. Application Data

(63) Continuation of application No. PCT/EP03/09631, filed on Aug. 29, 2003.

(30) Foreign Application Priority Data

Sep. 6, 2002 (DE) .................. 102 41 353

(51) Int. Cl.
- G09G 5/00 (2006.01)
- G06K 9/40 (2006.01)
- G06K 9/32 (2006.01)

(52) U.S. Cl. .................. 345/660; 382/260; 382/274; 382/298

(58) Field of Classification Search .......... 382/260, 382/274, 298; 345/660
See application file for complete search history.

(56) References Cited

U.S. PATENT DOCUMENTS

| | | | |
|---|---|---|---|
| 4,743,963 A | | 5/1988 | Abuyama |
| 4,945,351 A | * | 7/1990 | Naiman ................. 345/589 |
| 5,341,153 A | | 8/1994 | Benzschawel et al. |
| 5,455,600 A | | 10/1995 | Friedman et al. |
| 5,604,856 A | * | 2/1997 | Guenter ................. 345/473 |
| 5,821,913 A | | 10/1998 | Mamiya |
| 6,175,355 B1 | * | 1/2001 | Reddy ................. 345/691 |

(Continued)

FOREIGN PATENT DOCUMENTS

DE 694 22 871 T2 8/2000

(Continued)

OTHER PUBLICATIONS

Klompenhouwer, Michiel A. et al.; "Subpixel Image Scaling for Color Matrix Displays"; Paper; May 21, 2002; pp. 176-179; 2002 SID International Symposium Digest of Technical Papers; San Jose, California, USA.

(Continued)

*Primary Examiner*—Xiao M Wu
*Assistant Examiner*—David T Welch
(74) *Attorney, Agent, or Firm*—Daniel J. Santos

(57) ABSTRACT

A method and an apparatus for converting input data produced by sampling a color image having pixels arranged in a first grid into output data resulting in a reproduction of the color image having pixels arranged in a second grid, each pixel of the input data and of the output data having a plurality of sub-pixels, each sub-pixel of a pixel being associated with a color component of the color image, produce a sub-pixel of a color component of the output data by filtering the sub-pixels of the corresponding color component of the input data using a filtering function locally related to this sub-pixel of the output data.

15 Claims, 7 Drawing Sheets

U.S. PATENT DOCUMENTS

| | | |
|---|---|---|
| 7,095,036 B2 | 8/2006 | Kim et al. |
| 2001/0017631 A1 | 8/2001 | Oakley |
| 2002/0093502 A1* | 7/2002 | Koyama .................... 345/467 |
| 2003/0085906 A1* | 5/2003 | Elliott et al. ................ 345/613 |
| 2004/0116448 A1 | 6/2004 | Schmalz et al. |

FOREIGN PATENT DOCUMENTS

| | | |
|---|---|---|
| EP | 0 346 621 A | 12/1989 |
| EP | 0 644 684 B1 | 3/1995 |
| JP | 2146081 | 6/1990 |
| JP | 06-077182 | 3/1994 |
| JP | 2001-211408 A | 8/2001 |
| JP | 2002-041000 A | 2/2002 |
| JP | 2002-044570 A | 2/2002 |
| JP | 2002326395 A | 11/2002 |
| JP | 2004533427 T | 7/2003 |
| JP | 2003-259386 A | 9/2003 |
| JP | 2004-072696 A | 3/2004 |
| JP | 2004282076 A | 7/2004 |
| WO | WO 92/12495 A1 | 7/1992 |

OTHER PUBLICATIONS

Japan Office Action received on Apr. 7, 2009; JP Patent Application No. 2004-533427.

* cited by examiner

METHOD AND APPARATUS FOR CONVERTING A COLOR IMAGE

CROSS-REFERENCE TO RELATED APPLICATION

This application is a continuation of and claims priority to copending International Application No. PCT/EP03/09631, filed on Aug. 29, 2003, which designated the United States, which claimed priority to German Patent Application No. 102 41 353.3, filed on Sep. 6, 2002, and which is incorporated herein by reference in its entirety.

BACKGROUND OF THE INVENTION

1. Field of the Invention

The present invention relates to a method and an apparatus for converting color images, and, here, relates in particular to a method and an apparatus for converting input data produced by sampling a color image having pixels arranged in a first grid into output data resulting in a reproduction of the color image having pixels arranged in a second grid. In particular, the present invention relates to image scaling means for color display equipment having sub-pixels for different components.

2. Description of the Related Art

Scaling of images is employed, in particular, in displaying images on screens, the scaling being performed in a control circuit of a screen, such as a liquid crystal display screen (LCD screen). Such displays (screens) include a physically specified grid of pixels, each of the pixels including a trio of adjacent sub-pixels, each pixel including a sub-pixel for the red, green, and blue components of the image pixel, respectively, to be represented on the display. However, it is typically required for display systems including such screens to also be able to reproduce image data whose sampling grid differs from the grid which is physically implemented in the screen. If such image data is provided, the control circuit of the display has an image scaling device provided therein which is activated to produce a version of the image which has been adapted, for example by re-sampling, to the physical display grid.

Apparatuses enabling high-quality image resampling (image scaling) typically compute the resampled image data (output data) by applying multi-tap polyphase digital filters to the original image data (input data). Although it is possible to implement two-dimensional filters, it is usually more economical to implement image scaling by applying two one-dimensional filters: a horizontal scaling filter applied to each row or line in the image, and a vertical scaling filter applied to each column in the input image.

FIG. 1 shows a schematic representation of the scaling of a color image by converting the input pixels into output pixels in accordance with a conventional approach. In an exemplary manner, FIG. 1 shows six pixels $100_1$ to $100_6$ stemming from the original color image and representing the input data or input pixels. For the purposes of representing them on a screen it is now necessary to scale the input pixels so as to map same to the physically fixed grid of the display device, which is achieved by generating also six output pixels $102_1$ to $102_6$ based on the input pixels $100_1$ to $100_6$. Both for the input pixels $100_1$ to $100_6$ and for the scaled output pixels $102_1$ to $106_6$ it shall be assumed that the respective color components are evenly distributed across each pixel in the respective pixels.

By way of example, the generation of the output pixel $102_4$ shall now be considered. To obtain the value (e.g. intensity value) for this pixel $102_4$, a weighting function 104 is applied to input pixels $100_1$ to $100_6$, the weighting function 104 being related to the center of the output pixel $102_4$, as can be seen in FIG. 1. In the example shown in FIG. 1, the y axis is the scaling axis 106, and the distance from the center of the scaled pixel, i.e. from the center of the output pixel $102_4$ considered, is plotted along the x axis.

FIG. 1 shows the mathematical relationship between the input pixel data (pixels $100_1$ to $100_6$) and the scaled output pixel data produced by conventional apparatus or circuits. The luminance of an output pixel, e.g. of pixel $102_4$, is derived as a weighted sum of the luminances of the input pixels $100_1$ to $100_6$ centered around the position of the output pixel $104_4$ in the image. The precise weighting assigned to each of the input pixels is determined depending on the position of the input pixel relative to the center of the output pixel $102_4$, as may be seen from the curve of the weighting function 104 in FIG. 1.

An optimal choice of the weighting function 104 (filter kernel) and an optimal choice of the apparatus for efficiently realizing the weighted-sum calculations in one or more dimensions will be familiar to those skilled in the art.

In accordance with the apparatus, the conversion of the color images, represented in FIG. 1, for resampling (scaling) of same is realized by individually filtering the separated color components in the input pixel data. As is common practice, in the approach described in FIG. 1, all color components are filtered using identical sampling positions (or sampling phases), the identical sampling positions each relating to the center of the output pixel to be scaled (see pixel $102_4$ in FIG. 1). This approach is optimal if the images are displayed on display elements wherein the color components for each pixel are physically co-located.

However, this is relevant only in few exceptional cases, so that conventionally, no optimal resampling of the color images may be achieved, particularly in those cases where the sampling grid with which the input data or original color data has been produced differs from the physically fixed grid of the display element. In such situations, the sharpness of the image displayed is decreased, which is due to an increased passband attenuation as well as to an increase in the aliasing effect.

SUMMARY OF THE INVENTION

It is the object of the present invention to provide an improved method and apparatus enabling the scaling of color images with an increased sharpness.

In accordance with a first aspect, the present invention provides a method for converting input data generated by sampling a color image having pixels arranged in a first grid into output data resulting in a reproduction of the color image having pixels arranged in a second grid, each pixel of the input data and of the output data having a plurality of sub-pixels, each sub-pixel of a pixel being associated with a color component (R, G, B) of the color image, the method including generating a sub-pixel of a color component of the output data by filtering the sub-pixels of the corresponding color component of the input data using a filtering function locally related to this sub-pixel of the output data.

In accordance with a second aspect, the present invention further provides an apparatus for converting input data generated by sampling a color image having pixels arranged in a first grid into output data resulting in a reproduction of the color image having pixels arranged in a second grid, each pixel of the input data and of the output data having a plurality of sub-pixels, each sub-pixel of a pixel being associated with a color component of the color image, the apparatus including a processing unit receiving the input data and generating a sub-pixel of a color component of the output data by filtering the sub-pixels of the respective color component of the input data using a filtering function locally related to this sub-pixel of the output data.

Unlike the above-described conventional approach for scaling color images, the present invention teaches a novel approach in accordance with which each color component is processed, for example by suitable filter elements, using sampling positions or sampling phases corresponding to the current physical location of the sub-pixel of a color component. The advantage of the present invention is that the inventive approach provides scaled images which are clearly sharper, if same are displayed, than images created by conventional approaches as have been described above. In the scaled image, there is a smaller passband attenuation caused by the filters, as well as a smaller aliasing effect.

By means of the present invention, an improved method and an improved apparatus for resampling, or scaling, of color images, for example for an optimum display on color display elements, is thus provided, each picture element (pixel) being subdivided into separate sub-pixels each associated with a specific color component.

In accordance with a preferred embodiment of the present invention, the scaled output data is provided unclipped, i.e. no clipping function has been applied to the output data. In this case, a clipping error reduction is subsequently performed, in accordance with the preferred embodiment, for converting the input data into scaled output data, a distortion, or an error, being preferably found in the sub-pixel for each sub-pixel generated, it being possible that the distortion is specified by falling short of or exceeding the maximum admissible intensity for the output pixel. Subsequently these errors in the sub-pixel generated are compensated for by imposing a reverse distortion or error on adjacent sub-pixels.

Preferred developments of the present invention are defined in the sub-claims.

BRIEF DESCRIPTION OF THE DRAWINGS

Preferred embodiments of the present invention will be explained in more detail below with reference to the accompanying figures, wherein.

DETAILED DESCRIPTION OF EXEMPLARY EMBODIMENTS

Figure 2:
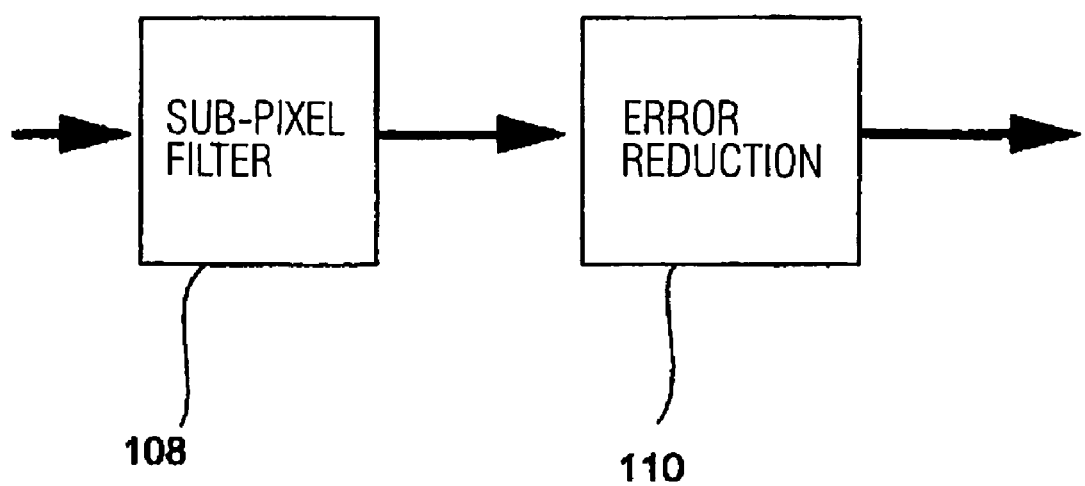
FIG. 2 shows a block diagram depicting the inventive approach for converting input pixels into output pixels in accordance with a preferred embodiment.

FIG. 2 shows a block diagram depicting the inventive approach for converting input pixels into output pixels in accordance with a preferred embodiment, the sub-pixels being filtered, in accordance with the invention, in a first block 108 and an error reduction being performed in a subsequent block 110. In the embodiment represented in FIG. 2, the original image data is input in block 108, and at the output of block 108, and thus at the input of block 110, filtered image data which are non-clipped, i.e. which have not undergone a clipping function, are provided, on the basis of which the clipping error reduction is performed. At the output of block 110, the clipped and filtered image data is then present in a scaled form, the image data having been corrected in accordance with a preferred embodiment using a one-dimensional error diffusion so as to correct clipping distortions.

In the filtering shown in a diagrammatic manner in block 108, polyphase scaling filters are preferably used for the respective sub-pixels.

With regard to the structure of the inventive apparatus for color scaling, represented in FIG. 2, it shall be pointed out that this is a representation of a preferred embodiment, but that the present invention, in its broadest aspect, merely relates to the generation of the scaled sub-pixels output from block 108, and that the additional error reduction reproduced in block 110 may optionally be performed in case such errors occur. Therefore, the invention will be discussed in more detail below in its broadest aspect with regard to the generation of the sub-pixels.

Figure 3:
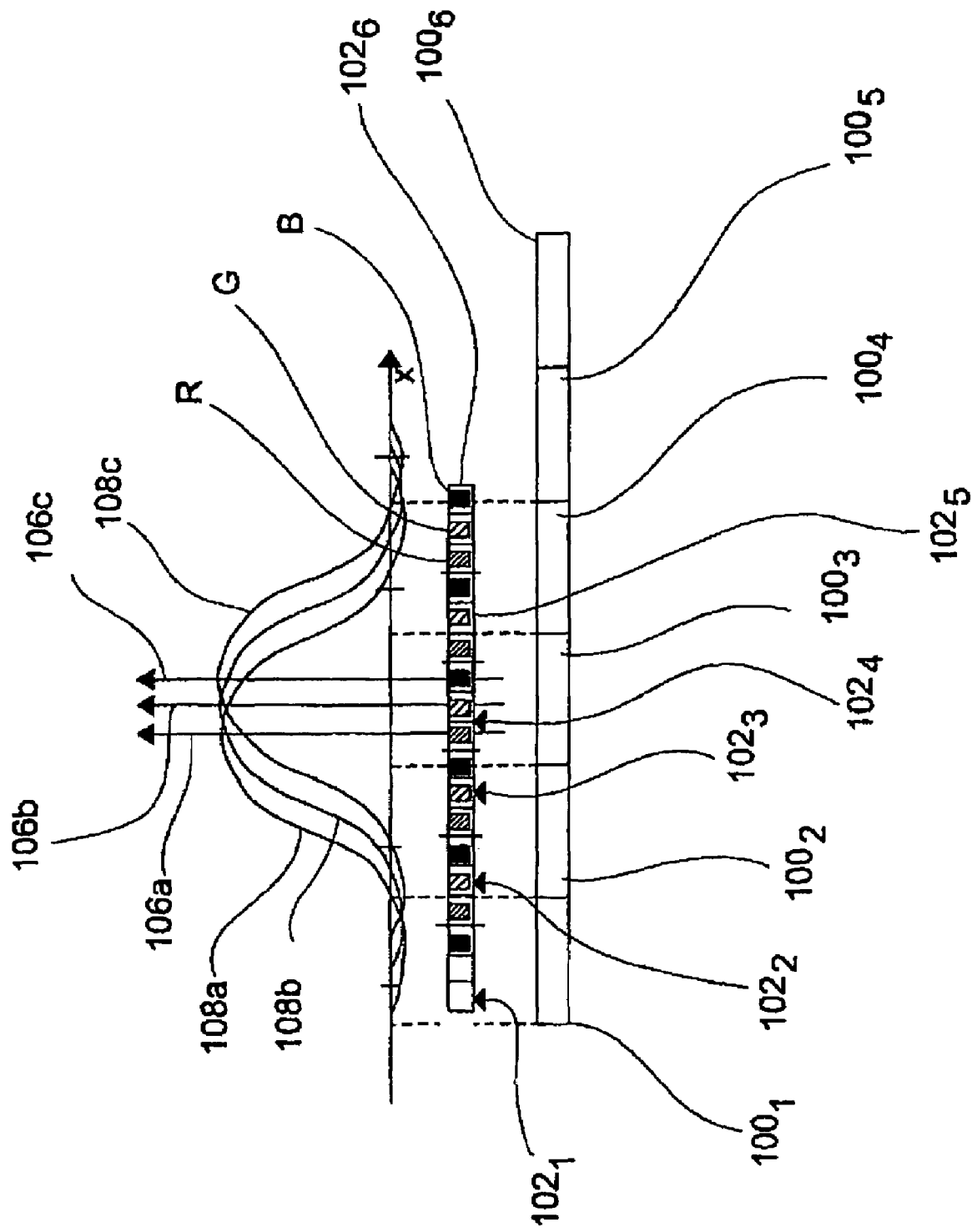
FIG. 3 shows a schematic representation of the conversion of input pixels into output pixels in accordance with the present invention.

FIG. 3 shows a diagrammatic representation for converting input pixels into output pixels in accordance with the present invention. In FIG. 3, like or similar elements having already been depicted in FIG. 1 have been provided with the same or similar reference numerals.

As may be seen from FIG. 3, here, too, six input pixels $100_1$ to $100_6$ are represented by way of example, which input pixels stem from the original image data. In this original image data, the color components are evenly distributed across each pixel.

In addition, the scaled output pixels $102_1$ and $102_6$ are represented in an exemplary manner, the sub-pixels for the respective color component, associated with the respective color pixels, being represented here, each of the pixels $102_1$ to $102_6$ being associated three sub-pixels, it being assumed here, for exemplary purposes, that a first sub-pixel is associated with the red color component, a second sub-pixel is associated with the green color component and a third sub-pixel is associated with the blue color component, as is depicted, by way of example, by reference numerals R, G, B with pixel $102_6$. For the conversion of these input pixels $100_1$ to $100_6$ into the output pixels, the scaled output pixel $102_4$ shall be considered, here, too, by way of example, as in FIG. 1.

Figure 1:
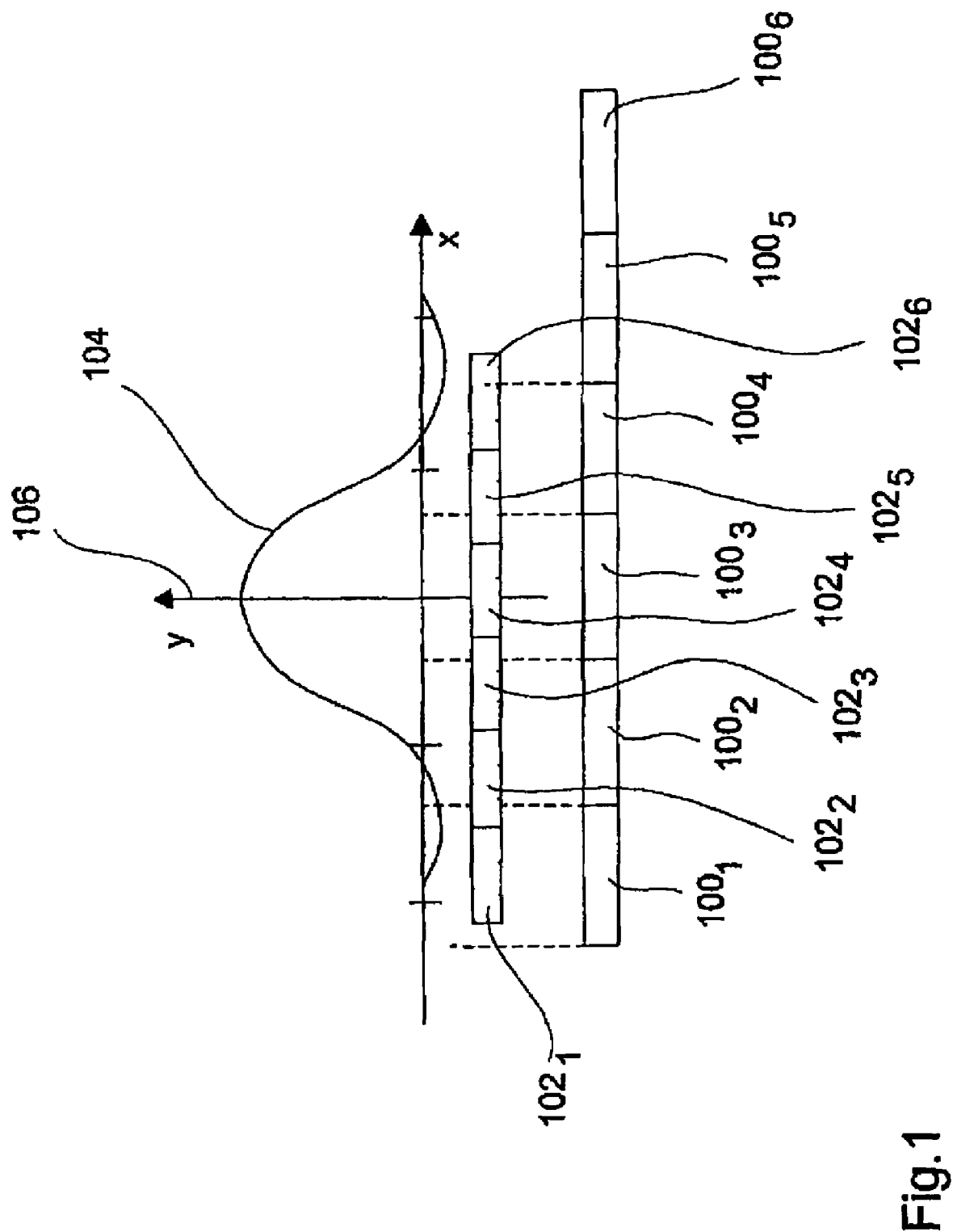
FIG. 1 shows a schematic representation of the conversion of input pixels into output pixels in accordance with a conventional approach.

As may readily be seen from a comparison with FIG. 1, the inventive approach is no longer based on associating a weighting function with each scaled output pixel, and thus associating the locally fixed weighting function with each color component, but, in accordance with the invention, each of the sub-pixels of the output pixel $102_4$ is rather associated a weighting function and a scaling axis of its own so as to determine, at this stage, for each sub-pixel, the portions of the input pixels involved in this sub-pixel. As can be seen, in the output pixel $102_4$ considered by way of example, the red color component has the scaling axis 106a associated with it, around which scaling axis the weighting function 108a associated with this sub-pixel is centered in a symmetrical manner. The sub-pixel for the yellow component of pixel $102_4$ has the sampling axis 106b and the weighting function 108b associated with it, and the sub-pixel for the blue component of pixel $102_4$ has the sampling axis 106c as well as the weighting function 108c associated with it.

The distance from the respective scaled sub-pixel center is plotted along the x axis shown in FIG. 3. The respective weighting functions 108a to 108c result in a corresponding weighting of the respective input color components in input pixels.

Unlike the state of the art, wherein it has been assumed, as has been discussed with regard to FIG. 1, that it is not only the input data that has an even distribution of the color components, but also the scaled output data, the inventive conversion takes into account that this is usually not the case, as has been described above. Due to the inventive form of conversion, the scaled image data now reflects the positions of the sub-pixels in the scaled output pixels.

Thus, FIG. 3 shows the mathematical relationship between input pixels $100_1$ to $100_6$ and output pixels $102_1$ to $102_6$ generated by the inventive scaling. The scaling is performed in a manner similar to FIG. 1, but the weighting of the luminance values of the input pixels for generating an output pixel for each color component preferably is related to a center of the sub-pixel in the output pixel $102_4$ to be generated. In the embodiment depicted in FIG. 3, the actual relationship relates to a display device wherein the pixels are subdivided into red, green and blue sub-pixels separated along the scaling axis.

Figure 4:
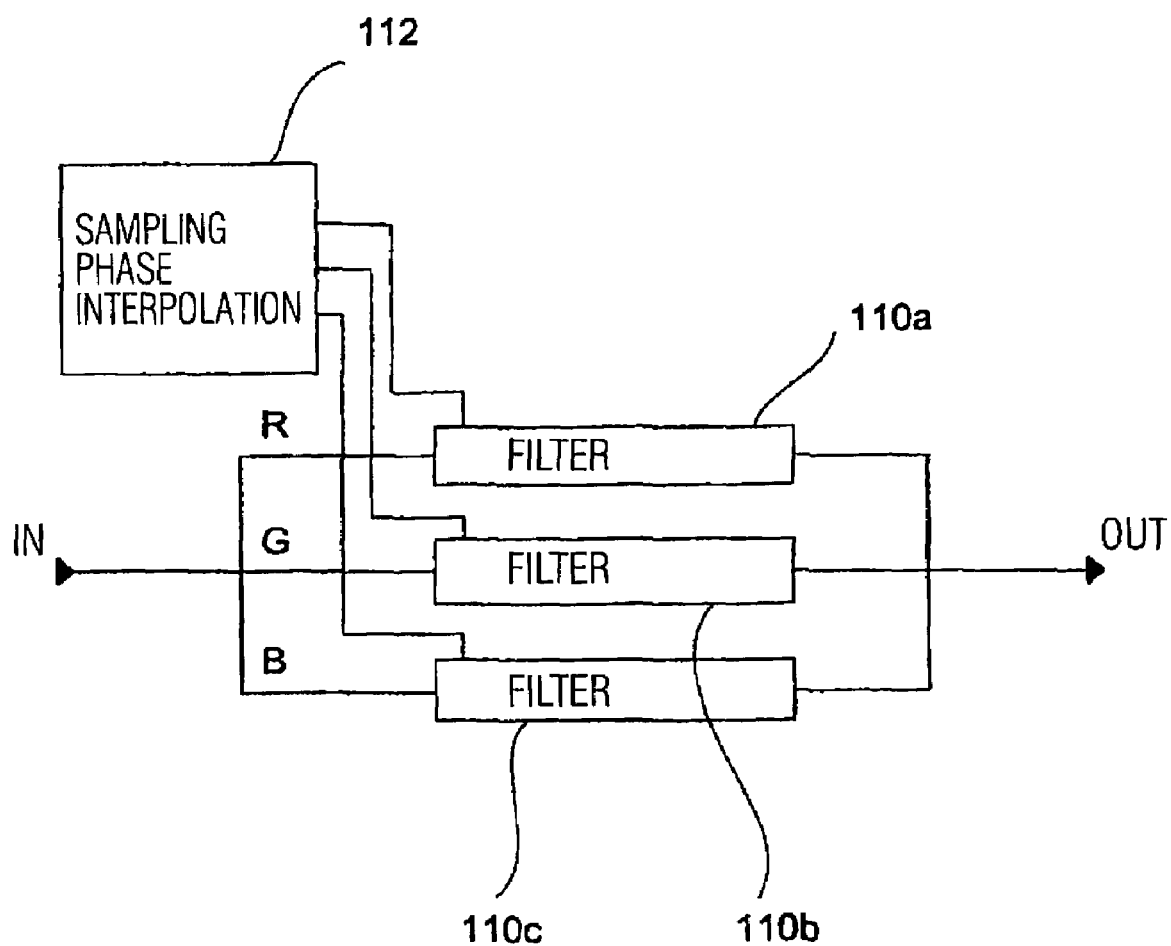
FIG. 4 depicts an embodiment of the inventive apparatus for converting input pixels into output pixels.

FIG. 4 depicts an embodiment of the inventive apparatus for converting input pixels into output pixels, which embodiment implements the method explained in more detail with reference to FIG. 3. FIG. 4 shows a block diagram for a one-dimensional sub-pixel scaling apparatus, it being assumed, for the embodiment represented, that each pixel includes three color components. Accordingly, the inventive apparatus includes three filter units 110a, 110b and 110c receiving the color components of the input pixel data, respectively. The filter units 110a to 110c are preferably polyphase filters receiving, as input data, the respective intensities of the color components in the original image. A sampling phase interpolation apparatus 112 is operatively connected to each of the filters 110a to 110b to provide suitable sampling positions for each of the color components, i.e. to shift the respective weighting functions in accordance with the desired local position relative to a sub-pixel. Preferably, the filtering functions are related to the center of a sub-pixel, as is depicted in FIG. 3.

Scaled sub-pixels, of which the output pixel data consists, are present at the outputs of filters 110a to 110b, respectively. The filters indicate an un-clipped intensity (an intensity not subject to a clipping function) for the respective sub-pixel, i.e. for the respective image color component in the scaled output image.

The embodiment of the inventive apparatus depicted in FIG. 4 are one-dimensional sub-pixel scaling means, the precise design and the precise implementation of suitable polyphase filters and phase interpolation elements being known to those skilled in the art.

The main difference between the inventive method and the inventive apparatus, on the one hand, and conventional image scaling approaches, on the other hand, is that, for one thing, separate phases, or sampling positions, are generated for each of the color components, i.e. for each polyphase filter 110a to 110c, whereby it is ensured that the sampling position, or phase, corresponds to the centers of the sub-pixels for the respective color component rather than, as is common in the art, to the center of the overall output pixel. Secondly, the polyphase-filter arithmetic units are implemented in accordance with a preferred embodiment such that no clipping function of the end value and/or of the intermediate value is performed, so that the arithmetic elements of the filter structures are configured such that they comprise a large numerical range, the size of which is sufficient for handling even such arithmetic results which are far beyond the admissible range.

It shall be pointed out at this point that, in the event that the sub-pixel centers coincide with the scaling axis, the inventive apparatus provides identical results such as are provided by a conventional scaling filter.

With regard to the sampling phases provided by means 112 it is to be pointed out that the relationship of the sampling phases provided to polyphase filters 110a to 110c depends on the actual scaling factor. Assuming that the sub-pixel elements for the color component c comprise centers spaced apart by $o_c$ pixel widths from the center of the pixel, the shift $\phi_c$ for the polyphase filter for the color component c would be as follows:

$$\phi_c = \phi + \frac{o_c}{s}$$

wherein:
s=filter scaling factor (the ratio of the spacing of the input samples to the spacing of the output samples), and
$\phi$=conventional filter sampling phase for a complete pixel A preferred embodiment of the inventive apparatus and of the inventive method will be explained below in more detail with reference to FIGS. 5 to 7, wherein the non-clipped sub-pixels are subject to additional error reduction.

Even though sharper scaled images may be produced by the inventive method, as has been explained above, the output signal of the scaling filter element or any scaling filter operation using a similar principle (see filters 110a to 110c in FIG. 4) may tend to reproduce visible color artifacts in the display caused by so-called clipping. It may be stated in this context that the shape of well-designed filter kernels is selected such that the weighting of input pixels may exceed ONE proximate to the filter center (kernel center), and that the weighting of pixels far from the filter center (kernel center) may be negative. If input images have sharp edges or lines with color component intensities close to the maximum or minimum intensity which may still be physically displayed, such kernels will create filtered output signals with intensities higher than the maximum admissible intensity or smaller than the minimum admissible intensity. Such intensities outside the admissible range are than clipped, i.e. subjected to a clipping operation. In accordance with this clipping operation the intensities are treated as the maximum intensity above the maximum admissible value, whereas intensities below the minimum admissible intensity are treated as the minimum intensity. This clipping operation may be part of the mode of operation of the display device. However, in digital equipment, where non-clipped data typically would lead to extreme distortions due to the numerical overflow or underflow, the clipping operation is conventionally performed explicitly as a last step of the filter calculation.

The distortions introduced by the clipping operation into the image represented are generally not visible to conventional scaling apparatuses acting upon the overall pixel. The distortions merely add additional blurring masked by the (more intense) blurring introduced by the scaling itself. With highly colored edges, the clipping operation may cause color distortions, these being rarely perceptible, however, since they occur only on edge pixels, and since human visual acuity is very poor with regard to closely spaced alterations with intense colors.

However, with sub-pixel scaling elements, the fact that each color component has been filtered with a different phase leads to the fact that the clipping operation introduces distortions both larger in terms of quantity and more visible. The magnitude of the distortion is larger since the distortion introduced by the clipping operation may have different signs in different color components. The maximum color distortion introduced may therefore be almost double that introduced by overall pixel scaling. Also, distortions due to the clipping operation are more visible since the color distortion occurs on black and white edges, so that the resulting colored rims present on the edges of non-colored areas are perceived significantly faster than distortions of the color on edges of colored areas.

This above-described problem of color distortion caused by the clipping operation is solved, in the present invention, in accordance with the embodiment described below, by post-processing the scaled output signals output by filters 110a to 110c (see FIG. 4). In accordance with the preferred embodiment, a one-dimensional error diffusion unit is used to correct clipping errors, whereby color distortions are reduced to a level such that they are no longer perceptible.

Figure 5:
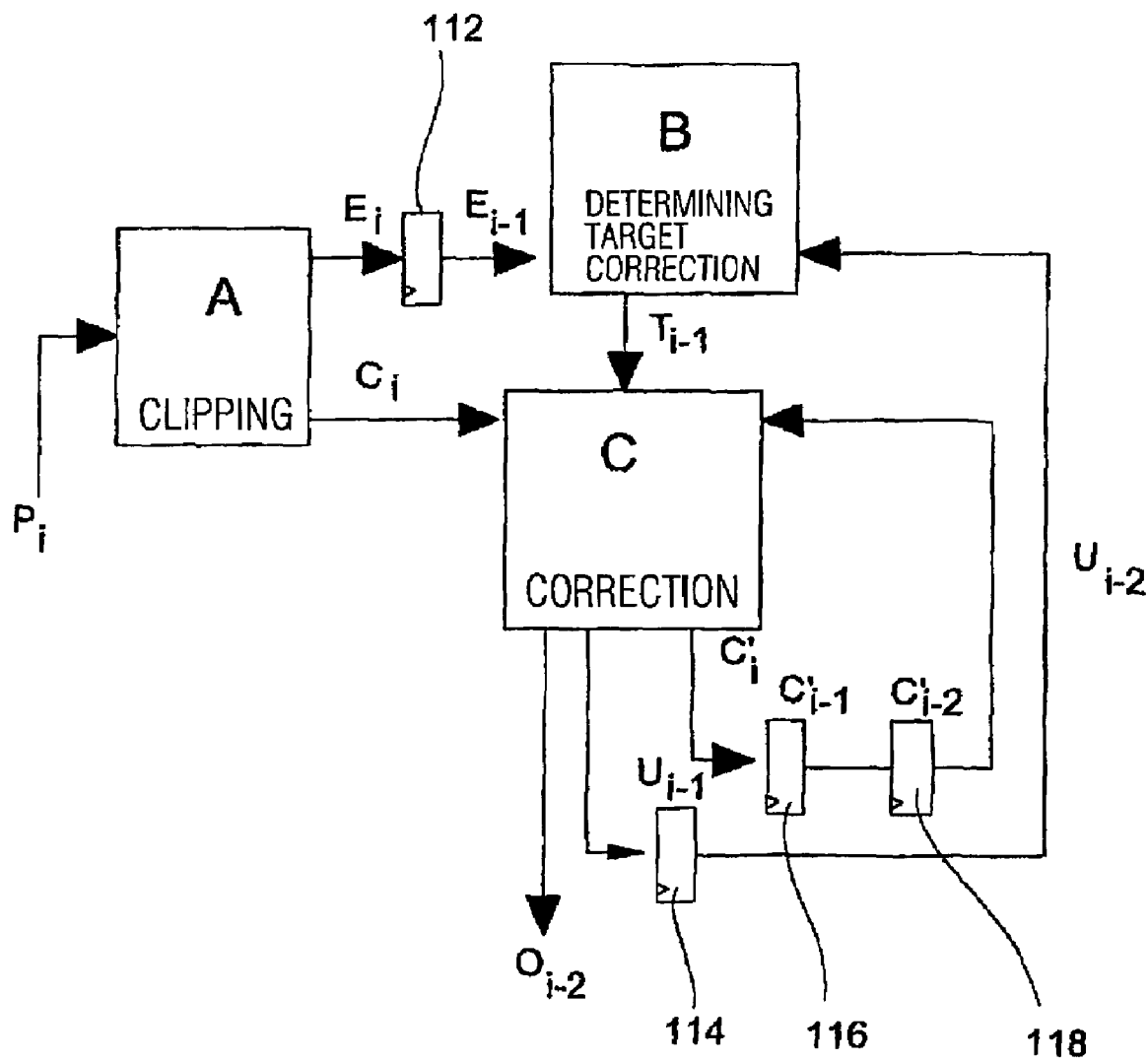
FIG. 5 depicts an embodiment of an inventive apparatus for reducing distortions/errors in the output pixels generated in accordance with the invention.

FIG. 5 depicts an embodiment of an inventive apparatus for reducing clipping distortions for a color channel in accordance with a preferred embodiment of the present invention. The apparatus for reducing the clipping distortion includes a first module A, the so-called clipping module which receives, at an input, the non-clipped, filtered, i.e. scaled, intensity $P_i$ for a pixel i. Module A determines a clipping error $E_i$ and a clipped intensity $C_i$ present at the respective outputs of module A which can be seen in FIG. 5. The apparatus further includes a first latch 112 latching the signal $E_i$. In addition, a module B is provided which determines a target correction. At a first input, module B receives the clipping error $E_{i-1}$, latched in the first latch 112, for a pixel immediately preceding that pixel whose intensity is received at module A. Moreover, module B receives an uncorrected clipping error $U_{i-2}$ for a pixel preceding, by two pixels, that pixel whose intensity is received at the input of module A. On the basis of these input signals, module B determines the overall clipping error $P_{i-1}$ for the pixel preceding that pixel whose intensity is received at module A. The overall clipping error thus determined is input into the correction module C which creates, for a pixel preceding, by two pixels, that pixel whose intensity is received at module A, the output intensity $O_{i-2}$ reproducing the finally corrected, clipped output intensity of this pixel. In addition, module C creates the uncorrected clipping error $U_{i-1}$ for the pixel immediately preceding that pixel whose intensity is received at module A. This value is latched in a second latch 114. Moreover, module C creates the partially corrected, clipped intensity $C'_i$ latched in third and fourth latches 116, 118, so that the partially corrected, clipped intensity $C'_{i-2}$ may be again provided to module C for a pixel preceding the current pixel by two pixels.

The mode of operation of the arrangement depicted in FIG. 5 will be explained in detail below. The inventive apparatus for reducing color distortions due to the clipping operation is an essential feature of this embodiment of the present invention. The design of this apparatus benefits from the relatively small amount of spatial acuity of the human eye with regard to color changes. Distortions in the color of a specific pixel may be compensated for, with regard to the visibility to the human eye, by a process of error diffusion, wherein, for a specific pixel, a reverse and thus compensating distortion is introduced in the pixel adjacent to the former pixel. FIG. 5 shows the above-described block diagram of the apparatus for reducing the clipping distortion for a single color component of a color image. A complete apparatus would include the arrangement shown in FIG. 5 for each color component. For RGB color data being processed it would therefore be necessary, for example, to have an error reduction apparatus for the red, the blue and the green components.

The apparatus shown in FIG. 5 is separately associated with each output line of the filters shown in FIG. 4, so that the corresponding data relating to non-clipped color components output by the one-dimensional scaling filters depicted in FIG. 4 are subjected to the corresponding clipping distortion reduction. The filtered color-component intensity data is successively provided at the input (module A) in an amount of one pixel per time unit. Subsequently, clipped and corrected filtered color-component intensity data is output with a two-pixel delay. At the beginning of each row of pixels, latches 112 and 114 are reset to zero, and the output signal of the apparatus is suppressed until the third pixel has been processed. At the end of each line, the last two output pixel values must be read out from latches 116 and 118. For a horizontal one-dimensional scaling filter, each line corresponds to a row of pixels, and for a vertical one-dimensional scaling filter, each line corresponds to a column of pixels. The clipped and corrected output signal $O_{i-2}$ is obtained by means of the arrangement depicted in FIG. 5 in the manner set forth below.

In each operating cycle, module A receives the intensity $P_i$ for the pixel to be processed next (pixel i). From the intensity received, module A determines the clipped intensity $C_i$ and the clipping error $E_i$ for the pixel i to be processed, using the subsequent calculation specification:

$$E_i = P_i - C_i$$

$$C_i = \begin{cases} \text{MIN} & \text{if } P_i < \text{MIN} \\ \text{MAX} & \text{if } P_i > \text{MAX} \\ P_i & \text{else} \end{cases}$$

wherein:
MIN=minimum depictable intensity
MAX=maximum depictable intensity

The clipping error $E_{i-1}$ for the pixel i-1 preceding the current pixel i is passed on from latch 112 to the arithmetic unit B along with the uncorrected clipping error $U_{i-2}$ for the pixel i-2 preceding the current pixel i by two pixels. The arithmetic unit B calculates the overall error $T_{i-1}$ which must be corrected around pixel i-1. The calculation is based on the following calculation specification:

$$T_{i-1} = E_{i-1} + \delta(U_{i-2})$$

wherein $\delta$ typically is selected to be $\delta(x)=x \div 2$, which may readily be implemented and yields very good results with typical scaling kernels.

Different values or specifications for $\delta$ are possible, provided that these maintain the sign and reduce the magnitude. Selecting the different $\delta$ enables a compromise between the uncorrected errors and the tendency to show visible error diffusion artifacts. A function which reduces the magnitude to a lesser degree would reduce the uncorrected errors but would tend to show visible error diffusion artifacts if they occur within a specific error pattern.

It is possible, but not very practical, to select $\delta$ such that it reduces the magnitude by significantly more than half. Similar results which are not distinguishable in the visible range may be achieved more efficiently by omitting the calculation of $U_{i-1}$ and $U_{i-2}$ and by using the relationship $T_{i-1}=E_{i-1}$ instead.

Module C corrects the overall clipping error $T_{i-1}$, which has accumulated for pixel i-1, as fully as possible. The correction is performed by setting the intensities of the neighboring pixels, specifically of pixel i and of pixel i-2. For pixel i, the clipped intensity $C_i$ is set to create a partially corrected, clipped intensity C'i. For pixel i-2, the partially corrected, clipped intensity $C'_{i-2}$ determined in the preceding calculation step is set to obtain the finally corrected, clipped output intensity $O_{i-2}$ for this pixel.

The overall setting used is selected such that it nearly equals $-T_{i-1}$, provided that this is possible without causing the intensities set to exceed the physically depictable intensity ranges. If an overall setting equaling $-T_{i-1}$ is possible, the settings for the two neighboring pixels are selected such that they are as equal as possible.

Two embodiments for implementing module C in FIG. 5 will be described in more detail below with reference to FIGS. 6 and 7. If various variations of the implementation, which exist only in the precise formulation of the individual arithmetic operations performed in module C, are ignored, two fundamental implementations exist for this module C.

Figure 6:
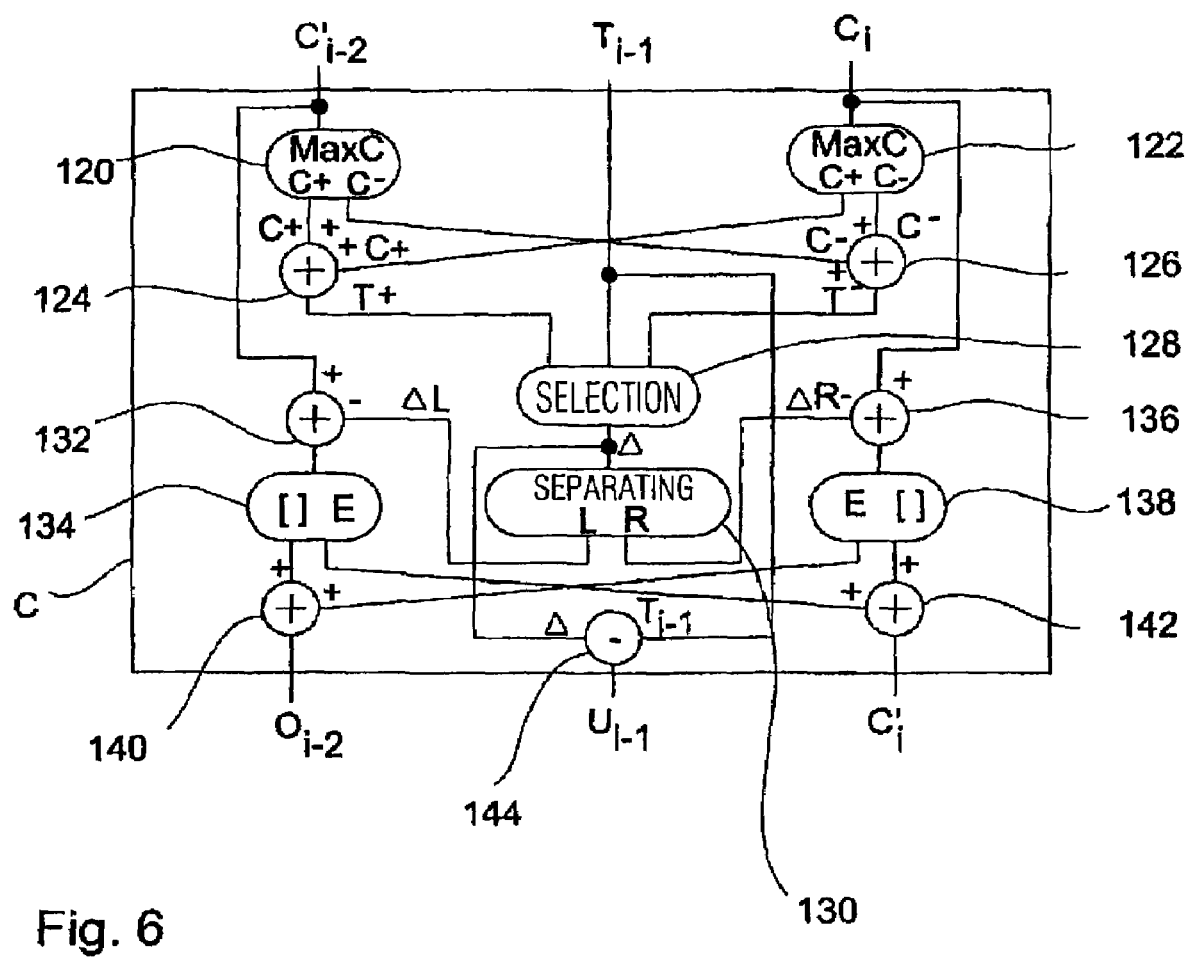
FIG. 6 shows a first embodiment of the correction module of the apparatus of FIG. 5.
Figure 7:
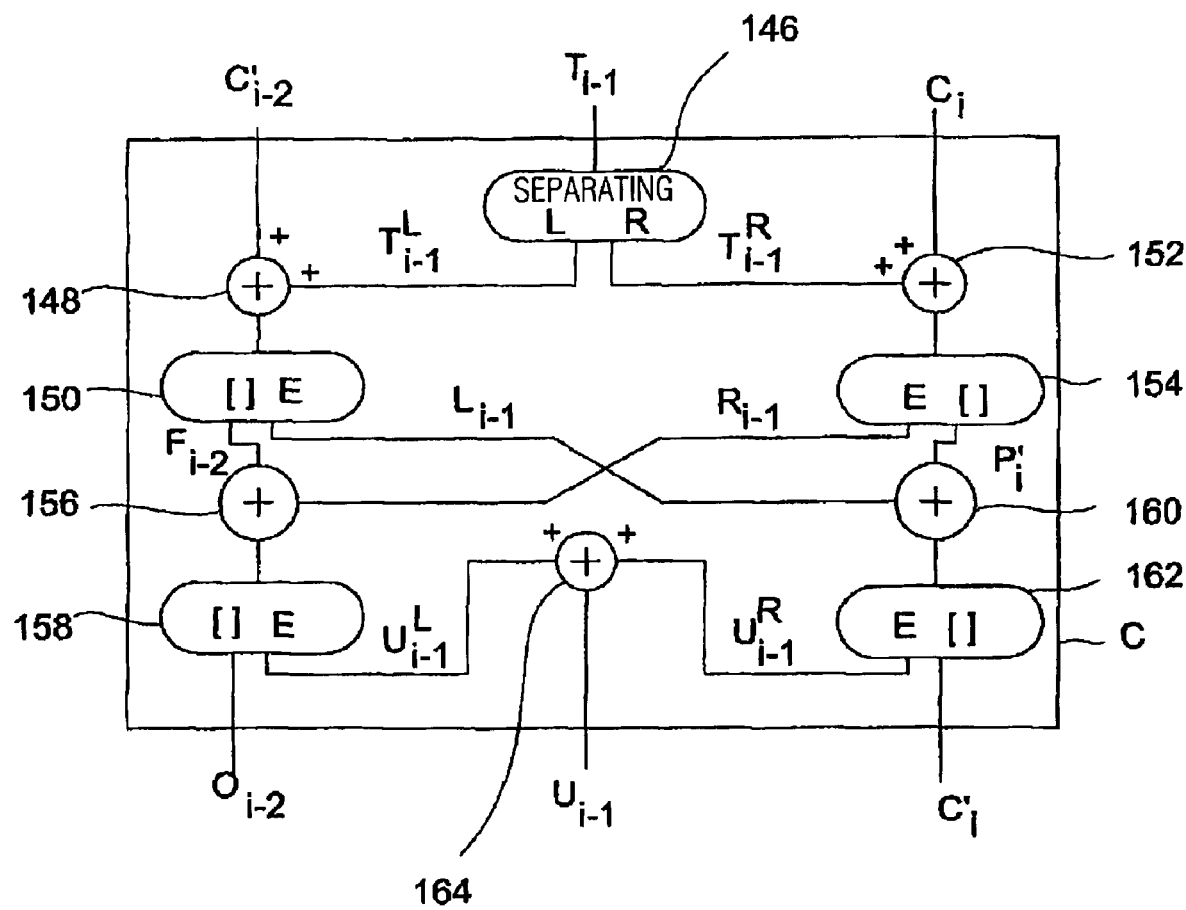
FIG. 7 shows a second embodiment of the correction module of the apparatus of FIG. 5.

A first approach, which will be discussed in more detail below with reference to FIG. 6, is to initially calculate the overall setting which may be corrected, and then to subsequently distribute this overall correction as evenly as possible between the partially corrected intensities $C_i$ and $C_{i-2}$.

FIG. 6 shows a block diagram for the implementation of module C using this approach.

In accordance with the embodiment depicted in FIG. 6, module C includes a first MaxC sub-module 120 and a second MaxC sub-module 122. By means of modules 120 and 122, the maximum possible positive and negative corrections are calculated. Sub-module 120 determines the maximum possible positive correction C+ and the maximum possible negative correction C− for the input value $C'_{i-2}$, which may be performed without creating intensities outside the displayable range. Similarly, module 122 creates the corresponding maximum possible positive and negative correction values for $C_i$. In sub-modules 120 and 122, the above-described calculation is performed using the following calculation specification:

$$C^+ = MAX - x$$

$$C^- = MIN - x$$

wherein:

x=input signal $C_i$ and $C'_{i-2}$, respectively.

The maximum possible corrections C+ determined by sub-modules 120 and 122 are summed by the summer 124 to obtain the maximum possible positive correction T+. Similarly, the maximum negative correction value determined by sub-modules 120 and 122, respectively, is added by means of summer 126 to determine the maximum possible negative correction T−.

The maximum possible positive and negative overall correction values T+ and T− thus calculated are input into a selection module 128 along with the overall error $T_{i-1}$. Selection module 128 calculates the actual correction Δ that may be performed, based on the input signals $T_{i-1}$, T+ and T−. The result of the selection is either $T_{i-1}$ if its magnitude is sufficiently small, otherwise the result of the selection is either T− or T+, depending on which of the values has the same sign as $T_{i-1}$. Selection sub-module 128 conforms with the following calculation specification for establishing the actual correction Δ.

$$\Delta = \begin{cases} \max(T^+, T_{i-1}) & \text{if } T_{i-1} < 0 \\ \min(T^-, T_{i-1}) & \text{if } T_{i-1} \geq 0 \end{cases}$$

The result of the selection by selection sub-module 128 is provided to the dividing sub-module 130 establishing a nearly equal partitioning of the selected actual correction value Δ into the correction values $\Delta_L$ and $\Delta_R$ for the input signals $C_i$, $C'_{i-2}$ in accordance with the following calculation specification:

$$\Delta_L = \Delta/2$$

$$\Delta_R = (\Delta+1)/2$$

The subdivision into $\Delta_L$ and $\Delta_R$ may also be performed in a manner reverse to that shown above in the calculation specification.=

The correction value ΔL is subtracted from $C'_{i-2}$ by the subtractor 132, and the result is provided to the clipping module 134 to restrict, or clip, the result of the formation of the difference to a range between the minimum admissible and the maximum admissible intensities.

Clipping sub-module 134 operates in compliance with the following calculation specification:

$$[x] = \max(\min(x, MAX), MIN)$$

$$E = x - [x]$$

wherein x represents the input variable of clipping sub-module 134 provided by subtractor 132. [x] represents the clipped range of the input variable to the depictable intensity range, and E stands for the difference between the clipped input value and the non-clipped input value.

Similar to the correction value $\Delta_L$, the correction value $\Delta_R$ is subtracted, in subtractor 136, from the value $C_i$, and the difference is provided to clipping sub-module 138, which operates in the same manner as clipping module 134, which has been described above.

The value E of clipping sub-modules 134 and 138 stands for the extent to which Δ must be distributed unevenly to achieve the maximum possible correction. The value E of each of the units 134 and 138 is therefore added to the clipped output value [x] of the other module 138 and 134 to ensure that the correct distribution of the correction Δ is achieved.

A summer 140 receives the signal $C'_{i-2}$ clipped to the visible intensity range and adds to this value the value E provided by the sub-module 138 to obtain the finally corrected, clipped intensity $O_{i-2}$ for pixel i-2.

A further summer 142 receives the signal $C_i$ clipped to the maximum depictable intensity range, to which the signal E created by the clipping subunit 134 is added, whereby the partially corrected, clipped intensity $C'_i$ is obtained for pixel i. In addition, in the embodiment of module C shown in FIG. 6, a subtractor 144 is provided which receives the actual correction Δ and the input signal $T_{i-1}$, and subtracts them from each other, whereby the uncorrected clipping distortion $U_{i-1}$ for pixel i-1 is produced, which is required to be used in the correction of pixel i.

A second embodiment for module C of FIG. 5 will be explained below in more detail with reference to FIG. 7. In this alternative approach for implementing module C, the overall error $T_{i-1}$ determined is distributed as evenly as possible, and subsequently the results are clipped and corrected to obtain a maximum possible correction without creating intensities outside the displayable range. In the implementation of module C represented in FIG. 7, a dividing submodule 146 is provided which receives the overall error $T_{i-1}$ calculated and calculates a nearly uniform partitioning of the overall error $T_{i-1}$ for pixel i-1 to create the correction values $T^L_{i-1}$ and $T^R_{i-1}$ in accordance with the following calculation specification $$T_{i-1}{}^L = T_{i-1}/2$$

$$T_{i-1}{}^R = (T_{i-1}+1)/2$$

The partitioning may also be effected in the reverse order.

The correction value $T^L_{i-1}$ is added to the partially corrected value $C'_{i-2}$, and the value output by the summer 148 will be provided to a clipping sub-module 150. The clipping sub-module 150 operates exactly like the clipping sub-modules described above with reference to FIG. 6 and creates a clipped result, specifically the pixel value $F_{i-2}$, which has been corrected further, and the remaining, uncorrected error $L_{i-1}$. The value $C'_{i-2}$ is the intermediately corrected value for pixel i-2, which value was calculated two operating cycles earlier.

The correction value $T^R_{i-1}$ is added to the partially corrected value $C_i$, and the output of the summer 152 is provided to the input of a clipping sub-module 154. The clipping sub-module 154 produces a clipped result which represents the partially corrected value $P'_i$ for pixel i as well as a remaining uncorrected error value $R_{i-1}$.

In the summer 156, the remaining error $R_{i-1}$ as well as the corrected pixel value $F_{i-2}$ are added, and the sum produced by the summer 156 is provided to a further clipping sub-module 158 operating on the basis of the calculation specification described above with reference to FIG. 6. Module 158 produces a clipped result and outputs the finally corrected value $O_{i-2}$ for pixel i-2. In addition, module 158 outputs the uncorrected part of $T^L_{i-1}$ as $U^L_{i-1}$.

In the summer 160, the remaining error $L_{i-1}$ and the partially corrected value P'i are added, and the result is supplied to the clipping sub-module 162, which produces a clipped result and outputs the corrected intermediate value $C'_i$ for pixel i and outputs the uncorrectable part of $T^R_{i-1}$ as $U^R_{i-1}$.

The uncorrectable parts of the overall error $T_{i-1}$ are added in the summer 164 to obtain the uncorrected clipping distortion $U_{i-1}$ for pixel i-1 which is employed for correcting pixel i.

In the above description of the preferred embodiments of the present invention, only individual sub-pixels of an output pixel have been contemplated. For creating a color image for display on a display device from original image data it is required, on the one hand, to convert, for each pixel, the sub-pixels associated in each case on the basis of the inventive approaches. In addition, all output pixels are subsequently produced in accordance with the inventive specifications to obtain the scaled color image.

Even though with regard to the preferred embodiments reference has been made above to color systems comprising RGB components, the present invention is evidently not restricted thereto, but may also be employed for systems using other color components of color parameters, e.g. CMY, HSV.

The present invention has been described by means of an example of one dimension. For the processing of one complete image, the invention may either be implemented in a two-dimensional manner or, as has been described above, it may be implemented in a one-dimensional manner for rows and columns, respectively.

While this invention has been described in terms of several preferred embodiments, there are alterations, permutations, and equivalents which fall within the scope of this invention.

It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for scaling a color image, the method comprising:
   (a) converting input data produced by sampling a color image having pixels arranged in a first grid of pixels into output data resulting in a reproduction of the color image having pixels arranged in a second grid of pixels, the first and second grids being different,
   wherein each pixel of the input data and of the output data comprises a plurality of sub-pixels, each sub-pixel of a pixel being associated with a color component of the color image, and
   wherein converting input data comprises producing a sub-pixel of a color component of a pixel of the output data by filtering the sub-pixels of the corresponding color component of the pixels of the input data using a filtering function locally related to said sub-pixel of the output data;
   (b) determining a distortion in the sub-pixel produced,
   wherein in step (b) an intensity associated with the sub-pixel produced is determined, an intensity limited to a minimum or a maximum intensity of the sub-pixel produced is determined, and an error reproducing the distortion is determined on the basis of the difference between the intensity of the sub-pixel produced and the limited intensity; and
   (c) compensating the distortion determined in step (b) by imposing a reverse distortion on sub-pixels in pixels of the output data adjacent to the pixel having the sub-pixel produced,
   wherein in a step (c1), an overall error of the sub-pixel produced is determined on the basis of the error produced in step (b) and of a non-corrected error of a preceding sub-pixel produced, and wherein in a step (c2), the overall error determined is corrected by setting the intensities of the preceding sub-pixel produced and the subsequent sub-pixel produced, and
   wherein the non-corrected error is that part of the preceding sub-pixel's overall error that was not correctable during compensation of the preceding sub-pixel's distortion due to the corrected intensity for the preceding sub-pixel reaching the limited intensity.

2. The method as claimed in claim 1 wherein the filtering function is symmetrical to a center of the sub-pixel to be produced.

3. The method as claimed in claim 1 wherein the filtering function weights the sub-pixels of the input data in relation to their local position with regard to the sub-pixel to be produced.

4. The method as claimed in claim 1 wherein in step (c2), setting the intensities is performed such that the overall error is substantially fully corrected, said intensities not falling short of or exceeding the maximum or minimum admissible intensities for the sub-pixels.

5. The method as claimed in claim 1 wherein in step (c2), the maximum possible correction is initially calculated, and the maximum correction calculated is subsequently distributed substantially evenly to the sub-pixels of adjacent pixels.

6. The method as claimed in claim 1 wherein in step (c2), the overall error is distributed substantially evenly to the sub-pixels of adjacent pixels, and wherein the intensities of these sub-pixels are subsequently set for correcting the distributed overall error.

7. The method as claimed in claim 1, wherein steps (a) to (c) are repeated for all sub-pixels of a pixel of the output data.

8. The method as claimed in claim 7 wherein the preceding process steps are repeated for all pixels of the output data.

9. An apparatus for scaling a color image, the apparatus comprising:
   a processing unit configured to convert input data produced by sampling a color image having pixels arranged in a first grid of pixels into output data resulting in a reproduction of the color image having pixels arranged in a second grid of pixels, the first and second grids being different,
   wherein each pixel of the input data and of the output data comprising a plurality of sub-pixels, each sub-pixel of a pixel being associated with a color component of the color image, and
   wherein the processing unit is further configured
      to receive input data and to produce a sub-pixel of a color component of a pixel of the output data by filtering the sub-pixels of the corresponding color component of the pixels of the input data using a filtering function locally related to said sub-pixel of the output data,
      to determine a distortion in the sub-pixel produced, wherein the processing unit determines an intensity associated with the sub-pixel produced, determines an intensity limited to a minimum or a maximum intensity of the sub-pixel produced, and determines an error reproducing the distortion on the basis of the difference between the intensity of the sub-pixel produced and the limited intensity, and
      to compensate the distortion by imposing a reverse distortion on sub-pixels in pixels of the output data adjacent to the pixel having the sub-pixel produced,
   wherein the processing unit includes a unit for determining an overall error of the sub-pixel produced on the basis of the error produced and of a non-corrected error of a preceding sub-pixel produced, and a unit for correcting the overall error determined by setting the intensities of the preceding sub-pixel produced and the subsequent sub-pixel produced,
   wherein the non-corrected error is that part of the preceding sub-pixel's overall error that was not correctable during compensation of the preceding sub pixel's distortion due to the corrected intensity for the preceding sub-pixel reaching the limited intensity.

10. The apparatus as claimed in claim 9, wherein the processing unit comprises:
   a plurality of filter arrangements, each of the filter arrangements being associated with one of the color components in the color image and being adapted to receive, from the input data, sub-pixels of a corresponding color component, and
   a unit operatively connected to each of the plurality of filter arrangements to associate a respective filtering function with each of the plurality of filter arrangements.

11. The apparatus as claimed in claim 9, wherein the filtering function is symmetrical to a center of the sub-pixel to be produced.

12. The apparatus as claimed in claim 9, wherein the filtering function weights the sub-pixels of the input data in relation to their local position with regard to the sub-pixel to be produced.

13. The apparatus as claimed in claim 9, wherein the unit sets the intensities such that the overall error is substantially fully compensated for, said intensities not falling short of or exceeding the maximum or minimum admissible intensities for the sub-pixels.

14. The apparatus as claimed in claim 9, wherein the unit initially calculates the maximum possible correction and subsequently distributes the maximum correction calculated substantially evenly to the sub-pixels of adjacent pixels.

15. The apparatus as claimed in claim 9, wherein the unit distributes the overall error substantially evenly to the sub-pixels of adjacent pixels, and subsequently sets the intensities of these sub-pixels for correcting the distributed overall error.

* * * * *